(12) United States Patent
Miyake

(10) Patent No.: US 10,639,940 B2
(45) Date of Patent: May 5, 2020

(54) PNEUMATIC TIRE

(71) Applicant: TOYO TIRE & RUBBER CO., LTD., Itami-shi, Hyogo (JP)

(72) Inventor: Akinori Miyake, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 243 days.

(21) Appl. No.: 15/683,204

(22) Filed: Aug. 22, 2017

(65) Prior Publication Data

US 2018/0154702 A1  Jun. 7, 2018

(30) Foreign Application Priority Data

Dec. 2, 2016 (JP) .................................. 2016-234732

(51) Int. Cl.
| | |
|---|---|
| *B60C 11/01* | (2006.01) |
| *B60C 11/13* | (2006.01) |
| B60C 11/03 | (2006.01) |

(52) U.S. Cl.
CPC .......... *B60C 11/1353* (2013.01); *B60C 11/01* (2013.01); *B60C 11/1323* (2013.01); *B60C 2011/013* (2013.01); *B60C 2011/0346* (2013.01); *B60C 2011/0348* (2013.01)

(58) Field of Classification Search
CPC .............. B60C 13/02; B60C 2011/013; B60C 11/1281
See application file for complete search history.

(56) References Cited

U.S. PATENT DOCUMENTS

| | | | | |
|---|---|---|---|---|
| 4,724,878 A | * | 2/1988 | Kabe .................. | B60C 11/0083 152/209.14 |
| 5,647,925 A | * | 7/1997 | Sumiya .................. | B60C 3/04 152/209.14 |
| 5,660,652 A | * | 8/1997 | Young .................. | B60C 11/00 152/209.14 |
| 2010/0116395 A1 | | 5/2010 | Andou | |

FOREIGN PATENT DOCUMENTS

| | | | |
|---|---|---|---|
| CN | 101631684 A | | 1/2010 |
| JP | 2001206015 A | * | 7/2001 |
| JP | 2013-147076 A | | 8/2013 |
| WO | 2008/111582 A1 | | 9/2008 |

OTHER PUBLICATIONS

Office Action dated Sep. 25, 2019, issued in counterpart CN Application No. 201710753352.8, with English translation (14 pages).

* cited by examiner

*Primary Examiner* — Robert C Dye
*Assistant Examiner* — Farah Taufiq
(74) *Attorney, Agent, or Firm* — Westerman, Hattori, Daniels & Adrian, LLP

(57) ABSTRACT

A shoulder land portion is sectioned into a main land portion and a sacrificed land portion by a narrow groove extending in a tire circumferential direction. A groove bottom portion of the narrow groove is formed by depressing a groove wall in the tread center side. A contour of the main land portion is formed by a first circular arc in a tread center side and a second circular arc in a tread end side. A radius of curvature R1 of the first circular arc is less than a radius of curvature R2 of the second circular arc. A ratio W/d satisfies a relationship $2 \le W/d \le 6$. The d is a depression width of a groove bottom portion. The W is a distance from a tread end side edge of the main land portion to a boundary between the first circular arc and the second circular arc.

7 Claims, 6 Drawing Sheets

PNEUMATIC TIRE

BACKGROUND OF THE INVENTION

Field of the Invention

The present invention relates to a pneumatic tire in which a narrow groove extending in a tire circumferential direction is formed in a shoulder land portion of a tread.

Description of the Related Art

As shown in FIG. 5, there has been known a pneumatic tire in which a narrow groove 73 extending in a tire circumferential direction is formed in a shoulder rib 70 (an example of the shoulder land portion) of the tread, and the pneumatic tire is disclosed, for example, in patent document 1. The shoulder rib 70 is sectioned into a main rib 71 in a tread center side and a sacrificed rib 72 in a tread end side by the narrow groove 73. In the tire structured as mentioned above, wear of the main rib 71 can be suppressed by concentrating the wear on the sacrificed rib 72. As a result, it is possible to improve an irregular wear resistance. The narrow groove 73 is also called as a defense groove, and is formed in a pneumatic tire for heavy load which is mainly used in a truck and a bus.

However, a ground pressure tends to become higher in a tread end side edge 71E of the main rib 71 even in the case that the narrow groove 73 is provided, a shoulder fall wear as shown by a broken line BL is generated due to the tendency. Therefore, a local irregular wear has been sometimes generated in the main rib 71. According to the knowledge of the inventor of the present invention, in order to prevent the shoulder fall wear in the main rib 71 as mentioned above, it is effective to form a groove bottom portion of the narrow groove 73 to be depressed to the tread center side as shown in FIG. 6, and decrease the ground pressure of the tread end side edge 71E. The shape of the groove bottom portion as mentioned above has been known as a method of suppressing a groove bottom crack of the narrow groove 73, for example, as disclosed in patent document 2.

However, according to search by the inventor of the present invention, in the aspect in FIG. 6, there has been found that the ground pressure is decreased in a region A1 which is the vicinity of the tread end side edge 71E, by the groove bottom portion of the narrow groove 73, however, the ground pressure comes to a relatively high state in a region A2 which is adjacent to the tread center side of the region A1, so that the local irregular wear is generated in the main rib 71 due to an uneven ground pressure distribution. As mentioned above, since the main rib 71 may generate the local irregular wear even in the case that the narrow groove 73 having the groove bottom portion as shown in FIG. 6 is provided, it has been known that there is room for improvement in relation to the irregular wear resistance.

PRIOR ART DOCUMENT

Patent Document

Patent Document 1: JP-A-2013-147076
Patent Document 2: WO2008/111582

SUMMARY OF THE INVENTION

The present invention is made by taking the above actual condition into consideration, and an object of the present invention is to improve an irregular wear resistance in a pneumatic tire in which a narrow groove extending in a tire circumferential direction is formed in a shoulder land portion of a tread.

The present invention provides a pneumatic tire comprising a narrow groove which extends in a tire circumferential direction, the narrow groove being formed in a shoulder land portion of a tread, the shoulder land portion being sectioned into a main land portion in a tread center side and a sacrificed land portion in a tread end side by the narrow groove, the main land portion having a continuous contour of a ground surface, wherein a groove bottom portion of the narrow groove is formed by depressing a groove wall in the tread center side, wherein the continuous contour of the ground surface of the main land portion is formed by a first circular arc in the tread center side and a second circular arc in the tread end side, the first circular arc and the second circular arc are connected to each other, and a radius of curvature R1 of the first circular arc is less than a radius of curvature R2 of the second circular arc, and wherein a ratio W/d satisfies a relationship $2 \leq W/d \leq 6$ in which d is a depression width of a groove bottom portion on the basis of the groove wall of the narrow groove in the tread center side, W is a distance from a tread end side edge of the main land portion to the boundary between the first circular arc and the second circular arc, and the ratio W/d is a ratio of the distance W in relation to the depression width d.

In the tire, since the groove bottom portion of the narrow groove is formed by depressing the groove wall in the tread center side, the ground pressure of the tread end side edge in the main land portion is decreased. Further, since the contour of the ground surface in the main land portion is formed by the first and second circular arcs, and satisfies the relationship of $2 \leq W/d \leq 6$, the second circular arc which has the larger radius of curvature in comparison with the first circular arc and is suppressed the protruding degree to the outer side in the tire radial direction is set to the region (the region A2 in FIG. 6) which is adjacent to the region (the region A1 in FIG. 6) having the ground pressure lowered by the groove bottom portion of the narrow groove and tends to increase the ground pressure. As a result, it is possible to suppress the local irregular wear by uniformizing the ground pressure of the main land portion and it is possible to improve the irregular wear resistance.

It is preferable that a ratio R2/R1 satisfies a relationship $1.5 \leq R2/R1 \leq 2.5$ in which the ratio R2/R1 is a ratio of the radius of curvature R2 in relation to the radius of curvature R1. Since the ratio R2/R1 is equal to or more than 1.5, it is possible to enhance the action of dispersing the ground pressure in the ground surface formed by the second circular arc by enlarging the difference in the radius of curvature between the first circular arc and the second circular arc. Further, since the ratio R2/R1 is equal to or less than 2.5, the first circular arc can be smoothly connected to the second circular arc easily, and this is advantageous for forming the ground surface of the main land portion into an appropriate shape.

DETAILED DESCRIPTION OF THE PREFERRED EMBODIMENT

Figure 1:
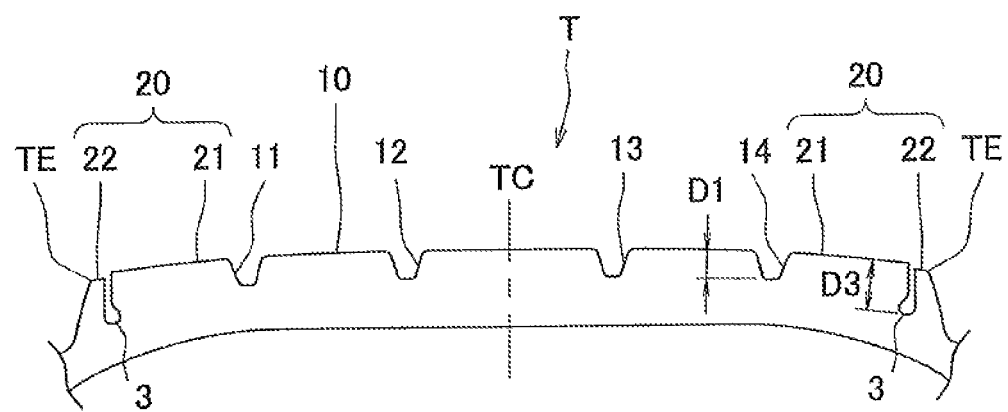
FIG. 1 is a cross sectional view of a tire meridian schematically showing one example of a tread of a pneumatic tire according to the present invention.
Figure 2:
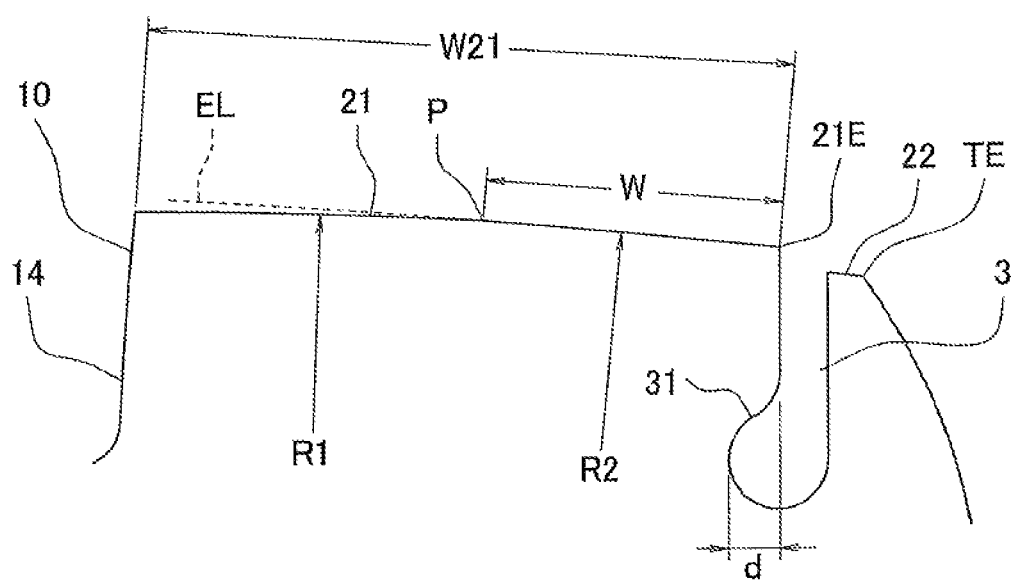
FIG. 2 is an enlarged view showing a substantial part of FIG. 1.

An embodiment of the present invention will be explained with reference to the drawings. FIG. 1 schematically shows a tread 10 of a pneumatic tire T according to the present embodiment, and FIG. 2 shows a substantial part of the tread 10 in an enlarged manner.

The pneumatic tire T has a pair of beads (not shown) and a pair of side walls which extend to an outer side in a tire radial direction from the beads, in the same manner as the general pneumatic tire, and the tread 10 is provided in such a manner as to be connected to an outer end in the tire radial direction of each of the side walls. Further, a carcass extending like a toroidal shape is provided between a pair of beads, and a reinforcing member such as a belt reinforcing the carcass is buried in the tread 10, however, an illustration of them is omitted.

A plurality of main grooves extending in a tire circumferential direction are formed in the tread 10, and four main grooves 11 to 14 are formed in the present embodiment. The tread 10 is sectioned into a plurality of land portions including shoulder land portions 20 by a plurality of main grooves. The shoulder land portion 20 is positioned between each of tread ends TE and respective one of the shoulder main grooves 11 and 14 positioned in the outermost sides in the tire width direction. In the present embodiment, the shoulder land portion 20 is provided as a shoulder rib which continuously extends in the tire circumferential direction, however, is not limited to this.

In the tire T, the narrow groove 3 extending in the tire circumferential direction is formed in the shoulder land portion 20 of the tread 10. The narrow groove 3 extends continuously in a straight line shape or a zigzag shape along the tire circumferential direction. A depth D3 of the narrow groove 3 is, for example, in a range which is 0.3 to 1.5 times of a depth D1 of the shoulder main grooves 11 and 14. The narrow groove 3 is formed narrower than the shoulder main grooves 11 and 14 on a ground surface of the tread 10, and a width of an opening portion of the narrow groove 3 is, for example, in a range between 0.3 and 5.0 mm. The narrow groove 3 may be provided only in the shoulder land portion 20 in one side, however, is preferably provided in the shoulder land portions 20 in both sides for achieving an excellent irregular wear resistance.

The shoulder land portion 20 is sectioned into a main land portion 21 in a tread center TC side, and a sacrificed land portion 22 in a tread end TE side by the narrow groove 3. In the present embodiment, the main land portion 21 is provided as a main rib which extends continuously in the tire circumferential direction, and the sacrificed land portion 22 is provided as a sacrificed rib which extends continuously in the tire circumferential direction. The narrow groove 3 is positioned in the vicinity portion of the tread end TE of the shoulder land portion 20, and the main land portion 21 is provided wider than the sacrificed land portion 22.

As shown in FIG. 2 in an enlarged manner, a groove bottom portion of the narrow groove 3 is formed by depressing a groove wall in the tread center TC side. More specifically, an inside concave curved surface 31 obtained by depressing the groove wall in the tread center TC side is formed in the groove bottom portion of the narrow groove 3. The inside concave curved surface 31 is formed by a flection surface which is depressed to an inner side in the tire width direction and is formed into a circular arc cross section, and is extended annularly along the tire circumferential direction. As mentioned above, the narrow groove 3 has the groove bottom portion which is wider than the opening portion of the narrow groove 3 and is formed into a rounded shape.

In the light of appropriately reducing the ground pressure of a tread end side edge 21E of the main land portion 21, a depression width d of the groove bottom portion based on the groove wall in the tread center TC side of the narrow groove 3 is preferably at least 0.5 mm, and is set, for example, between 0.5 and 6.0 mm. The depression width d is determined as a distance between the tread end side edge 21E and a tangent line of the inside concave curved surface 31 in a tire meridian cross section, the tangent line being drawn so as to be perpendicular to a contour of the ground surface of the main land portion 21 (extend in the normal line direction).

The groove bottom portion of the narrow groove 3 may be formed by depressing the groove walls in both sides including the tread end TE side in addition to the tread center TC side. However, in the case that the groove bottom portion of the narrow groove 3 is formed by depressing only the groove wall in the tread center TC side such as the present embodiment, a rigidity of the sacrificed land portion 22 is not lowered by the groove bottom portion of the narrow groove 3. As a result, an excellent tear resistance can be achieved. The tear indicates a phenomenon that the sacrificed land portion is scattered so as to be torn.

The contour of the ground surface of the main land portion 21 is formed by two circular arcs which are different in radius of curvature, specifically by a first circular arc in the tread center TC side and a second circular arc in the tread end side TE, and these circular arcs are smoothly connected. In FIG. 2, reference symbol R1 denotes a radius of curvature of the first circular arc, and reference symbol R2 denotes a radius of curvature of the second circular arc. In the main land portion 21, the radius of curvature R1 of the first circular arc is less than the radius of curvature R2 of the second circular arc, and a relationship R1<R2 is established. A position of a boundary P between the first circular arc and the second circular arc is defined as a position where an extension line EL of the second circular arc begins to come away from the first circular arc.

In the tire, a ratio W/d satisfies a relationship 2≤W/d≤6, and further satisfies 2.0≤W/d≤6.0 in which W/d is a ratio of a distance W from the tread end side edge 21E of the main land portion 21 to the boundary P between the first circular arc and the second circular arc in relation to the depression width d of the groove bottom portion of the narrow groove 3. More specifically, the boundary P is arranged away from the tread end side edge 21E to the tread center TC side, and the distance W thereof is set to be between 2 and 6 times of the depression width d. The dimensions such as the depression width d and the distance W are all measured in a no-load state.

In the tire T, since the groove bottom portion of the narrow groove 3 is formed by depressing the groove wall in the tread center TC side, it is possible to prevent a shoulder fall wear of the main land portion 21 by decreasing the ground pressure of the tread end side edge 21E. Further, in the case that the ground pressure in the vicinity region (the region A1 in FIG. 6) of the tread end side edge 21E is decreased, the ground pressure becomes relatively high in the region (the region A2 in FIG. 6) which is adjacent to the vicinity region, however, the irregular wear caused thereby is suppressed. Because, the second circular arc is set in the region which tends to be high in the ground pressure, by satisfying the relationship 2≤W/d≤6, and the ground pressure can be easily dispersed relatively in the ground surface which is formed by the second circular arc. Therefore, in the tire T, it is possible to suppress the local irregular wear by uniformizing the ground pressure of the main land portion 21 and improve the irregular wear resistance.

On the contrary, in the case that the ratio W/d is less than 2, the second circular arc is not appropriately set in the region (the region A2 in FIG. 6) which tends to be high in the ground pressure, and the uniformization of the ground pressure in the main land portion 21 can not be achieved. Therefore, the effect of improving the irregular wear resistance is hard to be obtained. Further, in the case that the ratio W/d goes beyond 6, the second circular arc is set in a range which is more than necessary beyond the region (the region A2 in FIG. 6) which tends to be high in the ground pressure, and the uniformization of the ground pressure in the main land portion can not be achieved. Therefore, the effect of improving the irregular wear resistance is also hard to be obtained.

In order to smoothly form the ground surface of the main land portion 21, the boundary P between the first circular arc and the second circular arc is preferably arranged in a center region of the main land portion 21. For example, a ratio W/W21 of the distance W in relation to a width W21 of the main land portion 21 preferably satisfies a relationship 0.1≤W/W21≤0.5.

A ratio R2/R1 of the radius of curvature R2 in relation to the radius of curvature R1 preferably satisfies a relationship 1.5≤R2/R1≤2.5. Since the ratio R2/R1 is equal to or more than 1.5, the action of dispersing the ground pressure in the ground surface formed by the second circular arc can be enhanced by enlarging the difference in the radius of curvature between the first circular arc and the second circular arc. Further, since the ratio R2/R1 is equal to or less than 2.5, the first circular arc and the second circular arc can be smoothly connected easily, thereby being advantageous for forming the ground surface of the main land portion 21 into an appropriate round shape.

The pneumatic tire T in which the narrow groove 3 and the main land portion 21 are formed as mentioned above can be manufactured in the same manner as the conventional tire manufacture step only by modifying an inner surface of a metal mold used in a cure molding to a shape which corresponds to the tread 10.

Figure 3:
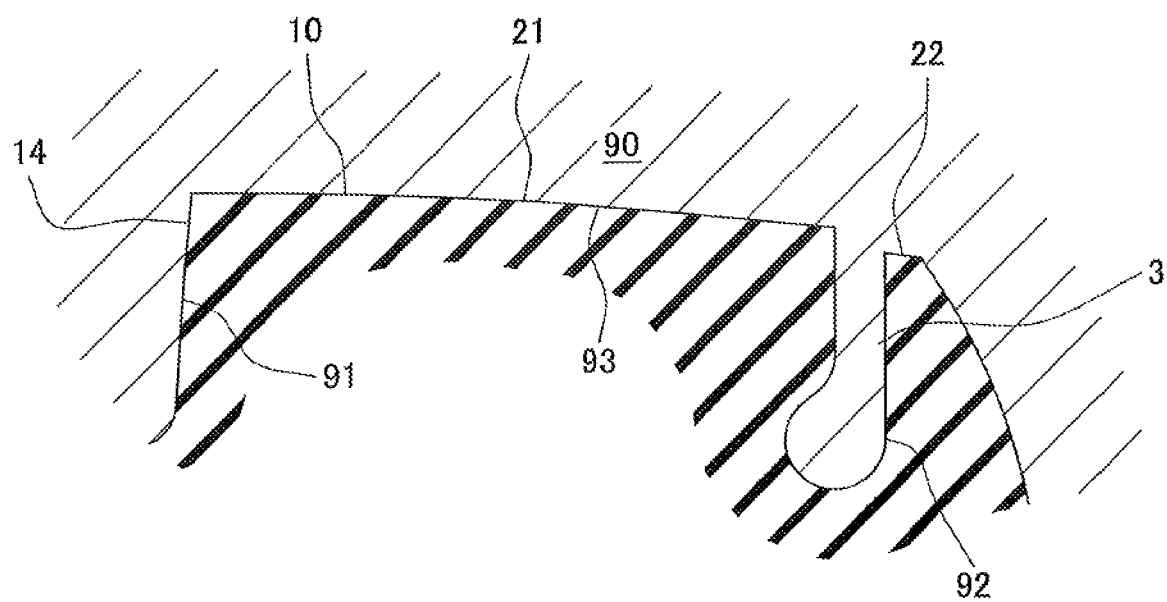
FIG. 3 is a cross sectional view showing a state of molding the tread.
Figure 4:
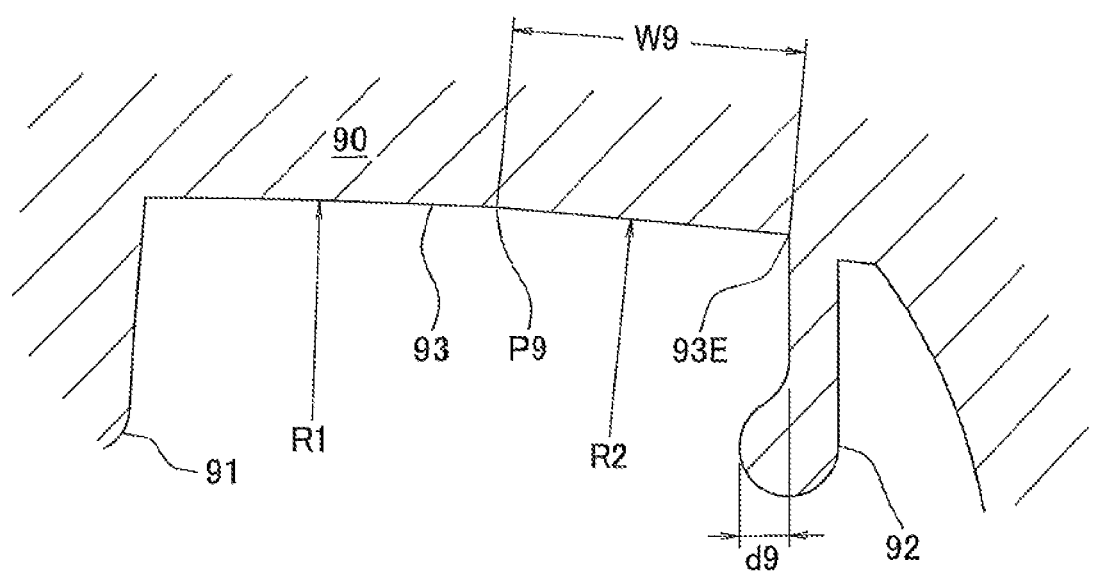
FIG. 4 is a cross sectional view showing a metal mold in FIG. 3.
Figure 5:
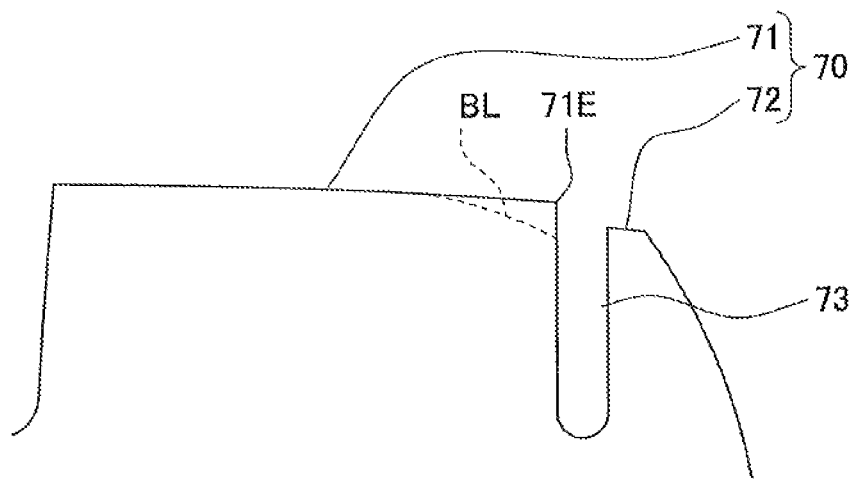
FIG. 5 is a cross sectional view showing a shoulder land portion of a conventional tire.

FIG. 3 shows a substantial part of the tread 10 at the cure molding time, and FIG. 4 shows a metal mold 90 which is away from the tread 10. The inner surface of the metal mold 90 is provided with a projection 91 which has a shape corresponding to the main groove 14, and a projection 92 which has a shape corresponding to the narrow groove 3. The main groove 14 and the narrow groove 3 are formed by pressing the metal mold 90 to the ground surface of the tread 10 as shown in FIG. 3 at the cure molding time. Further, the main land portion 21 is formed by a rubber which is filled in a concave portion 93 between the projection 91 and the projection 92.

A protruding width d9 of the projection 92 on the basis of the groove wall in the tread center side of the narrow groove corresponds to the depression width d of the groove bottom portion in the narrow groove 3, and the shape of the concave portion 93 corresponds to the shape of the main land portion 21 mentioned above. Therefore, a contour of the concave portion 93 is formed by a circular arc having the radius of curvature R1, and a circular arc having the radius of curvature R2, and the relationship R1<R2 is established as mentioned above. Further, a ratio W9/d9 of a distance W9 from a tread end side edge 93E of the concave portion 93 to a boundary P9 between these two circular arcs in relation to a protruding width d9 satisfies a relationship 2≤W9/d9≤6.

The pneumatic tire according to the present invention is the same as the normal pneumatic tire except the matter that the narrow groove is formed by the shoulder land portion of the tread as mentioned above, and the conventionally known materials, shapes and structures can be all employed in the present invention.

Since the pneumatic tire according to the present invention can achieve the excellent irregular wear resistance on the basis of the actions and effects as mentioned above, the pneumatic tire can be useful for the pneumatic tire for heavy load which is used particularly to the truck and the bus.

The present invention is not limited to the embodiment mentioned above, but can be modified and changed variously within a range which does not deviate from the scope of the present invention. For example, the tread pattern can be appropriately changed in correspondence to the used intended purposes and conditions.

EXAMPLES

An example which concretely shows the structure and effect of the present invention will be explained.

Method of Evaluating Irregular Wear Resistance

The tire was assembled in the wheel having the rim size 22.5×8.25, the pneumatic pressure was set to 760 kPa (TRA specified internal pressure), the traveling test was executed under the condition of the speed 80 km/h and the load 27.5 kN (TRA 100% load), and the width of the irregular wear generated in the end portion of the shoulder land portion was measured. The index number on the assumption that the result of a comparative example 1 is 100 is indicated by an inverse number, and the greater numerical value indicates that the irregular wear is more suppressed and the tire is more excellent in the irregular wear resistance.

Comparative Examples and Working Examples

Figure 6:
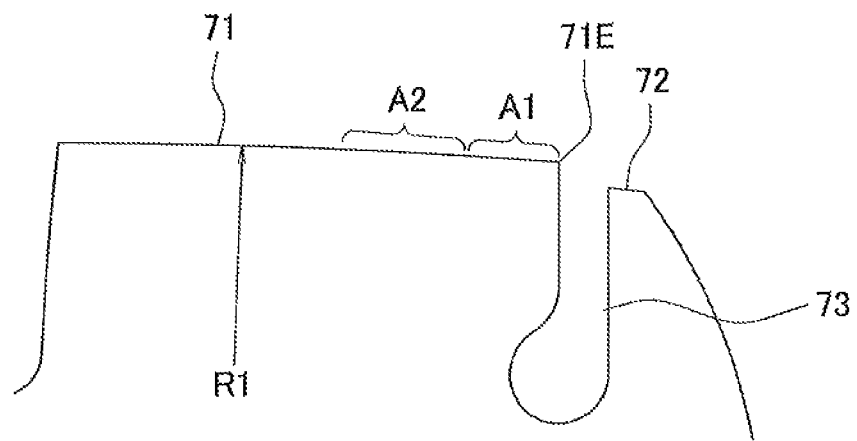
FIG. 6 is a cross sectional view showing a shoulder land portion of a tire according to a comparative example 1.

Comparative examples 1 to 3 and working examples 1 to 3 were set by differentiating a shape of (a main land portion in) a shoulder land portion, in a tire (size: 295/75R22.5) having a tread which is sectioned into five land portions by four main grooves. The other structures of the tire than the above are common in each of the examples. The comparative example 1 is structured, as shown in FIG. 6, such that the contour of the ground surface in the main land portion is formed by a single circular arc having a radius of curvature R1. Results of evaluation are shown in Table 1.

TABLE 1

|  | Comparative example 1 | Comparative example 2 | Working example 1 | Working example 2 | Working example 3 | Comparative example 3 |
|---|---|---|---|---|---|---|
| R1(mm) | 800 | 800 | 800 | 800 | 800 | 800 |
| R2(mm) | — | 1600 | 1600 | 1600 | 1600 | 1600 |
| R2/R1 | — | 2.0 | 2.0 | 2.0 | 2.0 | 2.0 |
| W(mm) | — | 2.5 | 5.0 | 10.0 | 15.0 | 17.5 |
| d(mm) | 2.5 | 2.5 | 2.5 | 2.5 | 2.5 | 2.5 |
| W/d | — | 1.0 | 2.0 | 4.0 | 6.0 | 7.0 |
| Irregular wear resistance | 100 | 100 | 108 | 115 | 107 | 99 |

From Table 1, it is known that the working examples 1 to 3 can achieve the excellent irregular wear resistance in comparison with the comparative examples 1 to 3.

What is claimed is:

1. A pneumatic tire comprising a narrow groove which extends in a tire circumferential direction, the narrow groove being formed in a shoulder land portion of a tread, the shoulder land portion being sectioned into a main land portion in a tread center side and a sacrificed land portion in a tread end side by the narrow groove, the main land portion having a continuous contour of a ground surface, wherein a groove bottom portion of the narrow groove is formed by depressing a groove wall in the tread center side, wherein the continuous contour of the ground surface of the main land portion is formed by a first circular arc in the tread center side and a second circular arc in the tread end side, the first circular arc and the second circular arc are connected to each other, and a radius of curvature R1 of the first circular arc is less than a radius of curvature R2 of the second circular arc, wherein a ratio W/d satisfies a relationship 2≤W/d≤6 in which d is a depression width of a groove bottom portion on the basis of the groove wall of the narrow groove in the tread center side, W is a distance from a tread end side edge of the main land portion to the boundary between the first circular arc and the second circular arc, and the ratio W/d is a ratio of the distance W in relation to the depression width d, wherein the boundary between the first circular arc and the second circular arc is arranged in a center region of the main land portion, and wherein a ratio W/W21 of the distance W in relation to a width W21 of the main land portion satisfies a relationship 0.1≤W/W21≤0.5.

2. The pneumatic tire according to claim 1, wherein a ratio R2/R1 satisfies a relationship 1.5≤R2/R1≤2.5 in which the ratio R2/R1 is a ratio of the radius of curvature R2 in relation to the radius of curvature R1.

3. The pneumatic tire according to claim 1, wherein the groove bottom portion of the narrow groove is formed by depressing only the groove wall in the tread center side of the groove wall in the tread center and a groove wall in the tread end side.

4. The pneumatic tire according to claim 1, wherein an inside concave curved surface obtained by depressing the groove wall in the tread center side is formed in the groove bottom portion of the narrow groove, and wherein the inside concave curved surface is formed by a flection surface which is depressed to an inner side in a tire width direction and is formed into a circular arc cross section, and is extended annularly along the tire circumferential direction.

5. The pneumatic tire according to claim 1, wherein the depression width d is set between 0.5 and 6.0 mm.

6. The pneumatic tire according to claim 1, wherein the shoulder land portion is positioned between a tread end and a shoulder main groove positioned in the outermost side in a tire width direction.

7. The pneumatic tire according to claim 6, wherein the narrow groove is formed narrower than the shoulder main groove on a ground surface of the tread.

* * * * *